US005802163A

United States Patent [19]
Miloslavsky

[11] Patent Number: 5,802,163
[45] Date of Patent: Sep. 1, 1998

[54] METHODS AND APPARATUS FOR IMPLEMENTING AN OUTBOUND NETWORK CALL CENTER

[75] Inventor: Alec Miloslavsky, San Carlos, Calif.

[73] Assignee: Genesys Telecommunications Laboratories, Inc., San Francisco, Calif.

[21] Appl. No.: 628,837

[22] Filed: Apr. 5, 1996

[51] Int. Cl.$^6$ .................................................. H04M 7/00
[52] U.S. Cl. .......................... 379/265; 379/210; 379/309
[58] Field of Search ....................................... 379/265, 266, 379/309, 207, 201, 210, 231, 234

[56] References Cited

U.S. PATENT DOCUMENTS

| | | | |
|---|---|---|---|
| 4,290,141 | 9/1981 | Anderson et al. | 455/2 |
| 4,320,256 | 3/1982 | Freeman . | |
| 4,345,315 | 8/1982 | Cadotte et al. | 364/900 |
| 4,355,207 | 10/1982 | Curtin . | |
| 4,355,372 | 10/1982 | Johnson et al. | 364/900 |
| 4,439,636 | 3/1984 | Newkirk et al. . | |
| 4,451,700 | 5/1984 | Kempner et al. . | |
| 4,489,438 | 12/1984 | Hughes | 381/51 |
| 4,517,410 | 5/1985 | Williams et al. . | |
| 4,521,643 | 6/1985 | Dupuis et al. . | |
| 4,523,055 | 6/1985 | Hohl et al. . | |
| 4,528,643 | 7/1985 | Freeny, Jr. | 364/900 |
| 4,539,435 | 9/1985 | Eckmann . | |
| 4,555,903 | 12/1985 | Jollissaint et al. | 395/155 |
| 4,559,415 | 12/1985 | Bernard et al. . | |
| 4,566,030 | 1/1986 | Nickerson et al. | 358/84 |
| 4,577,062 | 3/1986 | Hilleary et al. . | |
| 4,577,067 | 3/1986 | Levy et al. . | |
| 4,578,700 | 3/1986 | Roberts . | |
| 4,580,012 | 4/1986 | Matthews et al. . | |
| 4,584,602 | 4/1986 | Nakagawa . | |
| 4,587,379 | 5/1986 | Masuda . | |
| 4,598,367 | 7/1986 | DeFrancesco et al. | 364/408 |
| 4,603,232 | 7/1986 | Kurland et al. . | |
| 4,611,094 | 9/1986 | Asmuth et al. . | |
| 4,625,276 | 11/1986 | Benton et al. | 364/408 |
| 4,630,200 | 12/1986 | Ohmae et al. . | |
| 4,630,201 | 12/1986 | White . | |
| 4,634,809 | 1/1987 | Paulsson et al. . | |
| 4,649,563 | 3/1987 | Riskin . | |
| 4,654,482 | 3/1987 | DeAngelis . | |
| 4,667,287 | 5/1987 | Allen et al. | 364/200 |
| 4,674,044 | 6/1987 | Kalmus et al. . | |
| 4,696,029 | 9/1987 | Cohen . | |
| 4,697,282 | 9/1987 | Winter et al. | 379/67 |
| 4,756,020 | 7/1988 | Fodale | 379/112 |
| 4,757,267 | 7/1988 | Riskin | 379/113 |
| 4,763,191 | 8/1988 | Gordon et al. | 358/86 |
| 4,785,408 | 11/1988 | Britton et al. | 364/513.5 |
| 4,788,715 | 11/1988 | Lee | 379/84 |
| 4,812,843 | 3/1989 | Champion, III et al. | 340/905 |
| 4,866,756 | 9/1989 | Crane et al. | 379/88 |
| 4,893,328 | 1/1990 | Peacock | 379/67 |
| 4,896,345 | 1/1990 | Thorne | 379/67 |
| 4,908,850 | 3/1990 | Masson et al. | 379/88 |
| 4,953,204 | 8/1990 | Cuschleg Jr., et al. | 379/266 |
| 4,972,461 | 11/1990 | Brown et al. | 379/67 |

(List continued on next page.)

OTHER PUBLICATIONS

"Call Centers Go On-Line", by Margie Semilof. TecTrends: Web Integration, No date.

Primary Examiner—Ahmad F. Matar
Attorney, Agent, or Firm—Donald R. Boys

[57] ABSTRACT

A system for incorporating a remote home agent in a call center is accomplished by the home agent dialing a telephony switch and the telephony switch terminating the home agent's incoming call to a first station side port of the telephony switch. This action provides a continuing connection between the telephony switch and the home agent until the home agent disconnects. Incoming calls selected to go to the home agent may then be switched to the established connection. In one embodiment a physical connection is established between the first station side port to which the home agent is first connected, and a second station side port. Incoming calls selected to go to the home agent are then connected to the second station side port, which is connected to the fist station side port.

3 Claims, 2 Drawing Sheets

U.S. PATENT DOCUMENTS

| | | | |
|---|---|---|---|
| 5,001,710 | 3/1991 | Gawrys et al. | 370/110.1 |
| 5,017,917 | 5/1991 | Fisher et al. . | |
| 5,036,535 | 7/1991 | Gechter et al. | 379/210 |
| 5,073,890 | 12/1991 | Danielsen | 379/265 |
| 5,164,983 | 11/1992 | Brown et al. | 379/265 |
| 5,256,863 | 10/1993 | Feruson et al. | 235/383 |
| 5,261,096 | 11/1993 | Howarth | 395/650 |
| 5,271,058 | 12/1993 | Andrews et al. | 379/210 |
| 5,274,700 | 12/1993 | Gechter et al. | 379/210 |
| 5,278,977 | 1/1994 | Spencer et al. | 395/575 |
| 5,280,625 | 1/1994 | Howarter et al. | 395/200 |
| 5,299,260 | 3/1994 | Shaio | 379/210 |
| 5,343,477 | 8/1994 | Yamada | 371/8.2 |
| 5,392,400 | 2/1995 | Berkowitz et al. | 395/200 |
| 5,444,774 | 8/1995 | Friedes | 379/266 |
| 5,459,780 | 10/1995 | Sand | 379/210 |
| 5,467,391 | 11/1995 | Donaghue, Jr. et al. | 379/265 |
| 5,500,891 | 3/1996 | Harrington et al. | 379/265 |
| 5,528,678 | 6/1996 | Kaplan | 379/201 |
| 5,530,744 | 6/1996 | Charalambous et al. | 379/265 |

METHODS AND APPARATUS FOR IMPLEMENTING AN OUTBOUND NETWORK CALL CENTER

FIELD OF THE INVENTION

This invention relates to telephone communications, and particularly relates to methods and devices for allowing network service providers to provide call center services to their customers.

BACKGROUND OF THE INVENTION

Telephones are one of the most widely used communication equipments in the world. At first, telephones were merely a convenient tool to allow people to communicate while they are physically separated. Recently, many companies use telephones to market products and services, provide technical support for consumer products, allow callers to access their own financial data, etc. Thus, telephones are becoming a major business and marketing tool.

In order to more effectively use telephones for business and marketing purposes, call centers have been developed. In a call center, a large number of agents handle telephone communication with callers. The matching of calls between callers and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database server to obtain information about the caller who has been assigned that phone number. The software can now route the call to an agent who can best handle the call based on predefined criteria (e.g., language skill, knowledge of products the caller bought, etc.). The software immediately transfers relevant information to a computer screen used by the agent. Thus, the agent can gain valuable information about the caller prior to receiving the call. As a result, the agent can more effectively handle the telephone transaction.

It can be seen from the above example that the enabling technology requires a combination of telephone switching and computer information processing technologies. The term commonly used for this combined technology is computer-telephony-integration (CTI).

In a prior art call center, the routing of telephone calls to appropriate agents is performed by hardware and software located in, or close to, the premise of the call center. It is not possible for the telephone carrier to provide call center services to subscribers in an efficient manner. However, many small companies do not have the money or expertise to install and maintain complicated hardware and software. Even though they may ask computer consultants to assist them, the response time of these consultants to fix problems is generally slow. On the other hand, it is critical that the down time of a call center be low because the labor costs of agents and the costs of lost goodwill from frustrated callers are high. Consequently, it would be difficult to sell call center systems to small companies.

SUMMARY OF THE INVENTION

The present invention allows almost all the components in a call center system to be operated and maintained by a telephone network service provider (such as a telephone company) while the agents can be located at the premises of the customers of the provider. Because the same service can be provided to many customers, the service provider can buy the most reliable equipment and employ full-time technicians to maintain the equipment. As a result, the customers of the service do not have to install, operate and maintain the hardware and software of a call center while at the same time they may receive reliable and state-of-the-art services. Consequently, it would be possible for many small companies to take advantages of the call center technology.

It is difficult to use prior art call center and telephone technology to provide such service. If the call center equipment is located in the premise of the network service provider, the provider needs to establish telephone connections with agents in the premise of the customer when it is necessary to route calls to the agents. One of the problems is that it may take a long time to establish a telephone connection between the network service provider and an agent. Thus, if a call needs to be routed to the premise of the provider's customer, the caller has to wait for an intolerably long time because the network service provider needs to determine where to route the call and then establish a telephone connection with the appropriate agent in the customer's premise. The caller may terminate the call in frustration because of the long wait.

The present invention comprises a network switch which contains a "looped around" circuit for maintaining a continuous telephone communication between the network service provider and its customer. The network switch is located at the premise of the telephone network service provider. The looped around circuit comprises a pair of station trunks (located in the network switch) that are physically connected together. This arrangement allows an incoming call (originated by an agent in the premise of a customer) terminated at one of the station trunks to be continuously connected to the network switch, as long as the call is not disconnected by the caller (i.e., agent) who initiated the call. During the time the incoming call from the agent is connected to the station trunk, the network switch can communicate with the originating agent at any time without the need to reestablish the telephone connection.

The present invention also comprises a computer telephony system which performs routing functions. It can route calls of the network switch to appropriate telephones in the customer's premise. This computer telephony system is preferably located at the premise of the network service provider.

As pointed out above, the network service provider and agents in the customer's premise can be in continuous telephone communication after the agents call the station trunk. Thus, the call routed by the computer telephony system (in the provider's premise) can be connected to the customer's premise without the need to establish a new telephone connection. Consequently, the routing can be performed almost instantaneously.

These and other features of the present invention will become apparent from the following description when read in conjunction with the accompanying drawings and the appended claims.

DETAILED DESCRIPTION OF THE INVENTION

The present invention comprises a novel call center architecture and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
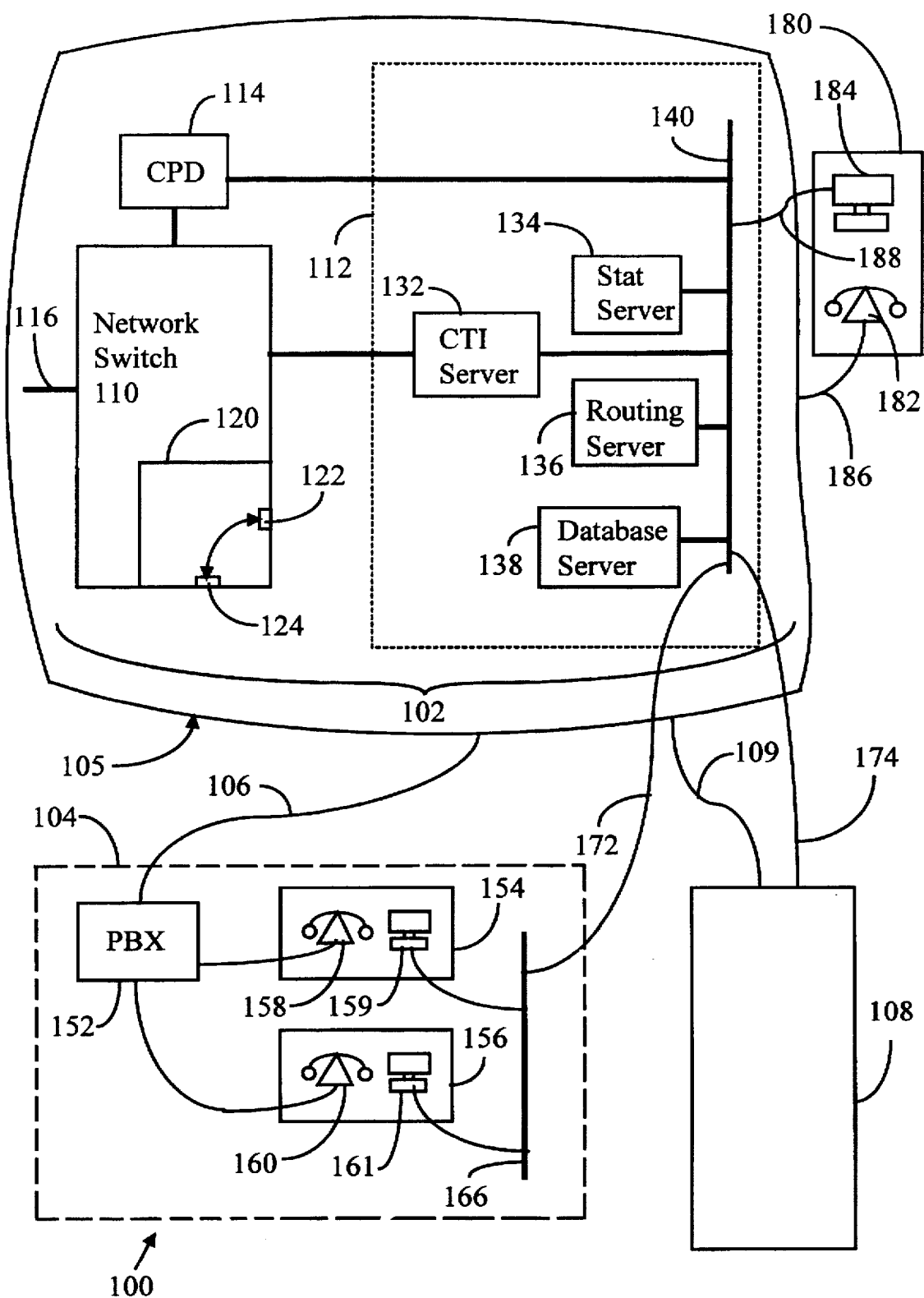
FIG. 1 is a drawing showing a call center architecture of the present invention.

FIG. 1 is a drawing showing a call center architecture 100 of the present invention. Architecture 100 contains a network provider call center 102 and a customer call center 104. Network provider call center 102 is maintained by an operator of a public-switched telephone network (PSTN) 105. Customer call center 104 is linked to PSTN 105 by a telephone link 106. Customer call center 104 is also linked to provider call center 102 by a data connector 172. In this architecture, most of the equipment associated with the implementation of a call center is located at provider call center 102 while the agents are located at customer call center 104.

Network provider call center 102 provides call center services to other customers, such as customer call center 108. These call centers are linked to PSTN 105 by telephone links. For example, customer call center 108 is linked to PSTN 105 by telephone link 109. Further, customer call center 108 is connected to provider call center 102 by a data connector 174.

In order to illustrate the operation of the present invention, the system in FIG. 1 is used to perform predictive dialing. In this case, agents in customer call center 104 want to contact potential buyers of a product or service. The telephone numbers of these potential buyers are stored in a database in provider call center 102. Equipment in provider call center 102 dials these telephone numbers. If a telephone number is busy, another telephone number is dialed automatically. When a potential buyer answers the call, the call is immediately routed to an available agent in customer call center 104. The agent can then talk to the buyer regarding the product or service.

Customer call center 104 comprises a private branch exchange and/or automatic call distributor (shown in FIG. 1 as PBX 152) and a plurality of stations, such as stations 154 and 156. Each station has a telephone (such as telephones 158 and 160 in stations 154 and 156, respectively) and a computer (such as computers 159 and 161). The telephones are connected to PBX 152. The computers are connected to a local area network 166, which is in turn connected to data connector 172. Agents in customer call center 104 are assigned to these stations to operate the telephones provided therein.

Provider call center 102 comprises a network switch 110, a CTI system 112 and a computer predictive dialer 114. Network switch 110 contains circuits that can provide switching and call distribution functions. Network switch 110 is coupled to a high bandwidth telephone line 116 so that a plurality of telephone channels are available for connecting to the telephones of potential buyers. Network switch 110 also contains a "looped around" circuit 120 for providing a looped around function. Looped around circuit 120 comprises a pair of station trunks 122 and 124 that are physically connected together. This arrangement allows an incoming call (originated from an agent in a customer call center) terminated at one of the station trunks, such as station trunk 122, to be continuously connected to network switch 110, as long as the call is not disconnected by the caller (i.e., the agent) who initiated the call. During the time the incoming call is connected to station trunk 122, network switch 110 can communicate with the caller (i.e., the agent) at any time without the need to reestablish the telephone connection.

Network switches are manufactured by many companies, such as AT&T, Northern Telecom or Ericsson. Station trunks are available in many network switches. These switches can be used to implement the above mentioned "looped around" circuit used in the present invention.

FIG. 1 shows the structure of CTI system 112. It contains a CTI-server 132, a stat-server 134, a routing server 136 and a database server 138. Stat-server 134 contains a database for storing all relevant activities of CTI system 112 (e.g., the current status and history of all calls in CTI system 112). Database server 138 contains information of customer call center 104, such as information on various agents who work in customer call center 104. Routing server 136 routes calls to appropriate stations in customer call center 104 based on factors such as the information contained in stat-server 134 and the status of various stations in customer call center 104. CTI-server 132, stat-server 134, routing server 136 and database server 138 are connected by a data communication network 140. Data connectors 172 and 174 connect data communication network 140 to the local area networks in customer call centers 104 and 108, respectively (such as local area network 166 in center 104).

CTI server 132 acts as a bridge between network switch 110 at one end and stat-server 134 and routing server 136 at the other end. CTI server 132 is designed to interface with network switches manufactured by different vendors and present a uniform application program interface (API) to stat-server 134 and routing server 136. An advantage of this arrangement is that individual components in provider call station 102 could be replaced and enhanced separately. For example, substantially the same routing server and stat-server could be used with network switches from different manufacturers (e.g., AT&T, Northern Telecom or Ericsson) by changing CTI server 132. Specifically, different versions of a particular implementation of CTI server 132 can be designed to match with switches made by different manufacturers (provided that the switches have a CTI link). These versions communicate with the same routing server, database server and stat-server through a standard protocol which is switch-independent.

In operation, when an agent begins work at one of the stations in customer call center 104, such as station 154, he dials a predetermined telephone number which terminates at network switch 110. When network switch 110 receives this call, it connect the call to station trunk 122. As a result, telephone 158 in station 154 is connected to network switch 110 until the agent terminates the call. The agent can also send his identification number and other information to routing server 136 using telephone 158 or computer 159. At this time, CTI system 112 knows that station 154 is now in operation and the identity of the agent in station 154. CTI system 112 can route calls to this station. Other agents can log on to the system using the same method.

When predictive dialing starts, CPD 114 causes network switch 110 to dial telephone numbers from its list. CPD 114 can be a software comprising a list manager (for managing a list of phone numbers to be dialed) and a dialer application. CPD 114 is connected to data communication network 140. When a connection to a potential buyer is established, network switch 110 passes this information to CTI system 112, which routes the call to one of the agents in customer call center 104. Because telephone connections between provider call center 102 and the agents have previously been established, network switch 110 can immediately connect the call to the selected agent. As a result, there is little delay in establishing communication between the agent and the buyer.

Figure 2:
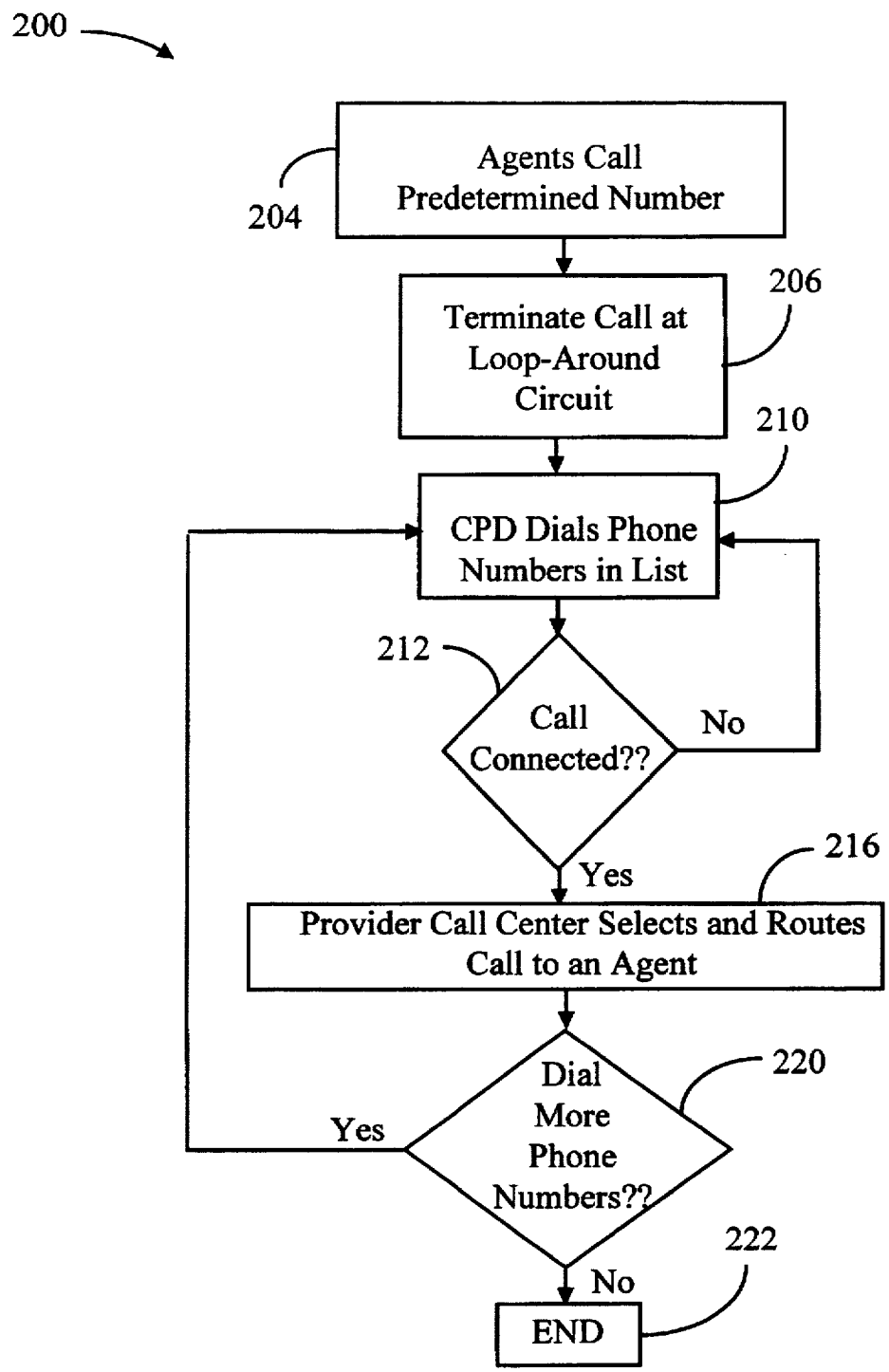
FIG. 2 is a flow chart showing an embodiment of the present invention.

FIG. 2 is a flow chart 200 showing the operation of the system shown in FIG. 1. In step 204, the agents in customer call center 104 call the predetermined number to provider call center 102. The call terminates at loop around circuit 120 (step 206). At step 210, CPD 114 dials phone numbers in a list. It determines whether a call is connected (step 212). If the answer is negative (i.e., the call not connected), flow chart 200 branches back to step 210 and another phone number from the list is selected for dialing. If the answer is positive, the software in provider call center 102 selects an appropriate agent to take the call. The call is routed to the selected agent (step 216). CPD 114 determines whether other phone numbers in the list need to be called (step 220). If more numbers need to be called, flow chart 250 branches back to step 210, and the phone numbers are dialed. If no more phone numbers in the list needs to be called, flow chart 200 terminates (step 222).

It should be appreciated that the above described operation can be applied to other customer call centers. Also, other services, in addition to predictive dialing, can also be performed by network provider call center 102.

It should also be appreciated that even though CTI server 132, routing server 136, stat-server 134 and database server 138 are shown as separate components, they could be combined into one, two or three components residing on one or more data processing devices. In one embodiment of the present invention, they are implemented as a client/server architecture, and they can be geographically separated.

In addition to customer call centers, individual stations can also use the service of the network call center. As an example, FIG. 1 shows a station 180 having a telephone 182 and a computer 184. Phone 182 is connected to PSTN 105 via line 186 and computer 184 is connected to data communication network 140 via data connector 188. In operation, an agent in station 180 dials a predetermined telephone number which terminates at network switch 110. Switch 110 then connects this call to station trunk 122. As a result, telephone 182 is connected to network switch 110 until the agent terminates the call. Consequently, the equipment and software in provider call center 102 are available to station 180.

The present invention can also be applied to multiple network call centers. The data communication networks in these network call centers (such as network 140 of FIG. 1) are connected to each other by a high speed data connector. The network switches of these call centers are connected to each other using reserved telephone connections. As a result, telephone calls can be routed from one call center to another without undue delay.

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for connecting telephony calls from a first telephony station to a remote agent at a second telephony station, the first station having a telephony switch coupled by a high bandwidth telephony trunk to a telephony network and a plurality of station-side ports to which incoming calls may be switched, the method comprising steps of:

(a) receiving a first call from the remote agent at the second telephony station;

(b) connecting the first call at a point in the telephony switch in a continuous manner requiring that the first call may be disconnected only from the second station;

(c) receiving a second call from the network; and (d) connecting the second call to the point within the telephony switch where the first call is connected, thereby connecting the second call to the second telephony station immediately without requiring call set up or ring signal.

2. The method of claim 1 wherein, in step (b) the first call is connected to a first station side port of the telephony switch, and in step (d) the second call is connected to a second station side port of the telephony switch, the first and second station side ports being connected to one another.

3. The method of claim 1 wherein the second station comprises a second telephony switch to which multiple agents may connect, whereby multiple agents may dial up the first station and be terminated in a manner requiring that the agent's calls may be terminated only from the second station.

* * * * *